United States Patent [19]

Brown

[11] 4,270,429
[45] Jun. 2, 1981

[54] ATTENUATED VIBRATION CIRCULAR SAW

[75] Inventor: Ernest W. Brown, Gresham, Oreg.

[73] Assignee: International Paper Company, New York, N.Y.

[21] Appl. No.: 115,822

[22] Filed: Jan. 28, 1980

[51] Int. Cl.³ .............................................. B27B 33/08
[52] U.S. Cl. ........................................ 83/851; 83/835
[58] Field of Search ................... 83/835, 851, 848–850

[56] References Cited

U.S. PATENT DOCUMENTS

| | | |
|---|---|---|
| 105,261 | 7/1870 | Shailer . |
| 156,748 | 11/1874 | Andrews . |
| 308,549 | 11/1884 | Boynton . |
| 352,867 | 11/1886 | Greist . |
| 1,240,939 | 9/1917 | Carlson . |
| 1,334,941 | 3/1920 | Blake . |
| 2,072,624 | 3/1937 | Owen . |
| 2,351,737 | 6/1944 | Blum . |
| 2,422,111 | 6/1947 | Lundberg ............................. 83/851 |
| 2,563,559 | 8/1951 | Sneva . |
| 2,568,870 | 9/1951 | Ronan . |
| 2,718,245 | 9/1955 | Owen . |
| 2,720,229 | 10/1955 | Drake . |
| 2,770,267 | 11/1956 | Edmiston . |
| 2,850,056 | 9/1958 | Kehl . |
| 3,799,025 | 3/1974 | Tsunoda ............................... 83/835 |
| 3,812,755 | 5/1974 | Danielson ........................... 83/835 |
| 3,854,364 | 12/1974 | Sundstrom .......................... 83/835 |
| 3,878,747 | 4/1975 | Soderstrom ......................... 83/835 |
| 3,981,216 | 9/1976 | Lemmon ............................. 83/848 |
| 4,024,785 | 5/1977 | Jansen-Herfeld ................... 83/848 |
| 4,034,638 | 7/1977 | Drum ................................... 83/835 |

OTHER PUBLICATIONS

"Reamers", Machinery's Handbook, 20th Edition, pp. 1634–1635, (1975).
DeVries et al., "On the Reduction of Noise in Circular Sawing", Proc. Sec. North Am. Metalwork Res. Univ. Wisc., pp. 22–34, 1974.
McCrary Saw & Tool Co., advertisement, "Woodworking & Furniture Digest", p. 22, Oct. 1979.
Puhlitzsch, "Gerauschentstehung und Gerauschbekampfung bei Holzbearbeitungmaschinen", Proc. Ergonomics in Sawmills & Woodworking Industries, IUFRO Symposium Sweden, Aug. 26–30, 1974, pp. 59–76.
Szymani et al., "Principal Developments in Thin Circular Saw Vibration & Control Research", 30th Annual Meeting of the Forest Products Research Society, Toronto, Canada, Jul. 11–16, 1976.

Primary Examiner—Frank T. Yost
Attorney, Agent, or Firm—W. A. Aguele; Walt Thomas Zielinski

[57] ABSTRACT

A circular saw of improved vibration characteristics in which the saw teeth are arranged in an odd number plurality of segments and wherein each segment includes a relatively rigid zone and a relatively flexible zone obtained by varying tooth spacing. Also, the tooth-to-tooth spacing is preferably randomly varied to reduce harmonic vibration.

11 Claims, 13 Drawing Figures

FIG. 1
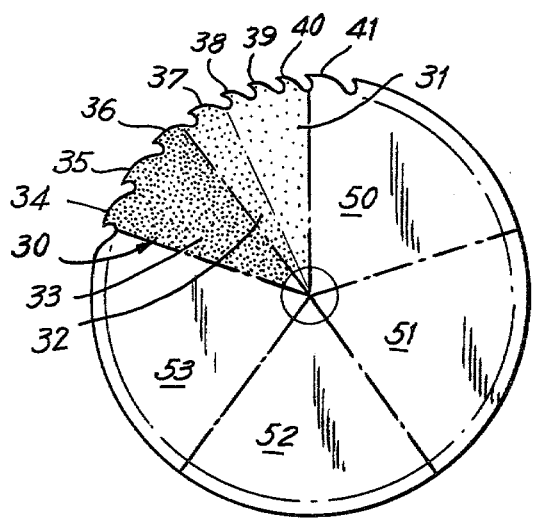
FIG. 2
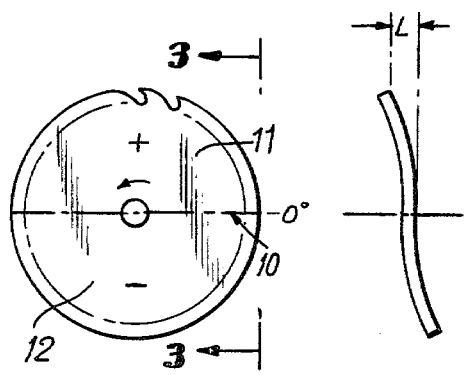
FIG. 3
FIG. 2a
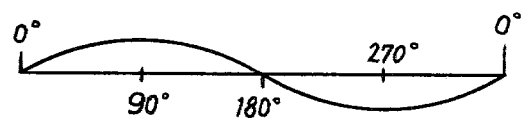

ATTENUATED VIBRATION CIRCULAR SAW

BACKGROUND OF THE INVENTION

This invention relates to improvements in circular saws and more particularly to improvements in high speed circular saws suitable for various cutting operations in modern saw mills. In order to achieve maximum operating efficiency, the trend has been to use increased saw speeds. Also, the thickness of the saw plate has been considerably reduced to decrease the amount of waste. The saw plate can no longer be considered a stiff member. Indeed, to an extent, it can be considered analogous to a semiflexible membrane connecting the arbor, or shaft, with the saw teeth.

With higher speeds saw plate vibration is a major problem and is a constraint on the maximum available cutting speed. Excessive saw plate vibration tends to cause overheating, crooked cuts, a shortening of the saw's life and noisy operating conditions. Also, and more importantly, excessive vibration can cause hazardous catastrophic failures of the saw.

Tests show that saw vibration manifests itself in two significant forms. In the first form standing wave patterns tend to establish themselves on the rotating saw plate. These are referred to as nodal vibration patterns. The second form involves tooth-to-tooth harmonic vibrations and the related vibrations of the material being cut. These will be more fully understood in the discussions which follow.

For reasons which I cannot explain, except perhaps because of habit or man's inherent sense of symmetry, circular saws have been traditionally designed to have even numbers of teeth. For example, saws having 12, 16, 18, 24, 36 and higher even numbers of teeth are common. It is also traditional to uniformly space the teeth around the periphery of the saw plate. The various even numbers of teeth commonly employed in circular saws are divisible by several factors. For example:

Twelve teeth are divisible by 2, 3, 4, or 6,
Sixteen teeth are divisible by 2, 4, or 8,
Eighteen teeth are divisible by 2, 3, 6, or 9,
Twenty-four teeth are divisible by 2, 3, 4, 6, 8, or 12, and
Thirty-six teeth are divisible by 2, 3, 4, 6, or 12.

The foregoing prior art circular saws are prone to incur both harmonic and nodal vibration problems. The evenly spaced saw teeth impact the work piece at equally spaced time intervals so that there is a tendency to set up harmonic vibrations in the saw plate, in the saw teeth and in the work piece, or material, being cut. Also, the divisible nature of the number of teeth in the saw makes likely the establishment of nodal vibration patterns resulting in a standing, or stationary, wave in the saw having a period which corresponds to a factor of the total number of teeth.

There have been many attempts to reduce saw vibration. These have met with only limited success. Thus, for example, the varying of tooth spacing within narrowly repetitious patterns has been proposed by Owen, et al, in patent U.S. Pat. No. 2,718,245 and by Blum, in U.S. Pat. No. 2,351,737. Also, varying the height of alternate teeth has been proposed by Soderstrom in U.S. Pat. No. 3,878,747 and by Owen, et al, above. Also, systematic variations of the side bevels in adjacent groupings of teeth has been proposed by Edmiston in U.S. Pat. No. 2,770,267. In addition to the foregoing, investigators have suggested the use of asymetrical edge slots to dampen nodal vibrations. However, none of the foregoing prior art recommends a satisfactory solution of the problem of dampening nodal vibration while minimizing tooth-to-tooth harmonic vibration and maintaining a substantially continuous circular saw.

SUMMARY OF THE INVENTION

In accordance with one aspect of the invention, there is provided a circular saw having improved vibration characteristics which includes a circular saw plate and a multiplicity of saw teeth circumferentially disposed around the saw plate. The teeth are positioned in a plurality of generally equal angular segments around the saw plate such that each segment includes a plurality of the teeth, the majority of which are randomly spaced from each other. Also, each segment includes a first angular zone which is generally stiffer than the balance of the segment. The quantity of the segments around the saw plate is an odd number.

As the saw is rotated at relatively high speeds, the segments tend to induce a nodal vibration pattern whose period corresponds to two of the segments and, because the number of segments is an odd number, the periodic reinforcement necessary to sustain a nodal vibration pattern tends to be avoided by an out-of-phase relationship of the vibration excursion occurring at the beginning of one revolution with respect to the vibration excursion occurring at the end of the revolution.

In accordance with another aspect of the invention, the first angular zone of each segment is rendered stiffer than the balance of the segment by the use therein of more widely spaced teeth than used in the balance. Also, in accordance with a preferred aspect of the invention, the quantity of the aforesaid angular segments is a prime number and the quantity of saw teeth within each of the angular segments is a prime number so that vibration possibilities arising from the divisibility of the number of teeth employed are, in large measure, avoided.

In accordance with yet another aspect of the invention, the tooth-to-tooth spacing within the zones of each segment is randomly varied within predetermined limits to minimize tooth-to-tooth harmonic vibrations and associated vibrations of the work piece.

In view of the foregoing, it is an object of the present invention to provide a circular saw of improved vibration characteristics.

It is another object of the invention to provide an improved high speed circular saw having predetermined vibration characteristics.

It is a further object of the invention to provide a circular saw of improved vibration characteristics having an essentially continuous pattern of saw teeth and being devoid of edge slots or other weakening discontinuities.

The foregoing objects and other advantages and features of the present invention will be more fully understood in reference to the following descriptions taken in conjunction with the accompanying drawings.

DESCRIPTION OF THE DRAWINGS

FIG. 1 is a front elevation view of a circular saw embodying principles of the present invention.

FIG. 2 is a front elevation view of a rotating prior art circular saw showing one nodal diameter of vibration.

FIG. 3 is a side elevation view of the circular saw illustrated in FIG. 2.

FIGS. 2a, 4a, 5a, and 6a are graphical representations of the lateral displacement waves associated with the nodal vibration patterns shown in FIGS. 2, 4, 5, and 6, respectively.

DETAILED DESCRIPTION OF THE PREFERRED EMBODIMENT OF THE INVENTION

Before describing the preferred embodiment of the invention, it will be worthwhile to describe certain characteristics of the nodal vibration phenomenon. In FIG. 2, a single nodal diameter 10, is shown. As the saw is rotated at high speeds, the half segment 11 is laterally displaced in a positive direction, i.e., toward the observer, while the half segment 12 is displaced away from the observer, in the negative direction. The lateral displacement is shown in FIG. 3. Notwithstanding the high speed of rotation, the nodal diameter 10 remains essentially fixed and each element of the saw is caused to flex from the positive direction to the negative direction as it passes from the positive zone to the negative zone. The flexing causes substantial internal stress of the saw plate. The saw plate will likely fail by cracking if the stress exceeds the maximum strength of its material. The nodal vibration pattern shown in FIG. 2 tends to establish itself in circular saws having even numbers of teeth which are divisible by the factor 2. The stationary wave associated with this nodal vibration pattern is shown in FIG. 2a. The ordinate represents lateral displacement and the abscissa represents angular distance around the saw plate. The lateral displacement is shown as the dimension L in FIG. 3.

Figure 4:
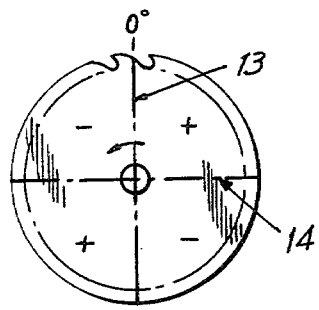
FIG. 4 is a front elevation view of a rotating prior art circular saw showing two nodal diameters of vibration.
Figure 4A:
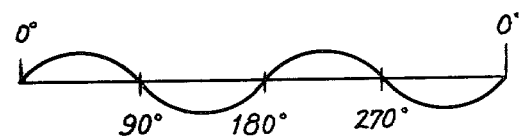

FIG. 4 shows a nodal vibration pattern having two nodal diameters 13, 14 which tends to establish itself in circular saws having an even number of teeth divisible by the factor 4. The nodal diameters 13, 14 define the nodal line of zero lateral displacement and remain generally stationary as the saw is rotated at high speeds. The zones between the nodal diameters experience the positive and negative lateral displacements shown in FIG. 4a.

Figure 5:
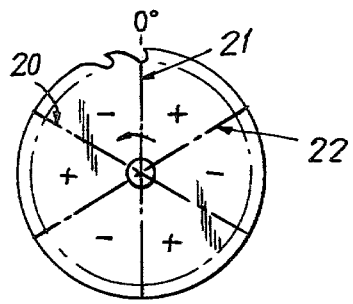
FIG. 5 is a front elevation view of a prior art rotating circular saw showing three nodal diameters of vibration.
Figure 5A:
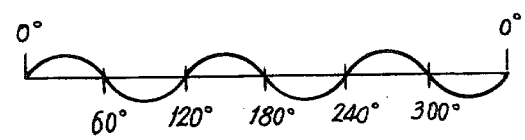

FIG. 5 illustrates a nodal vibration pattern involving three nodal diameters 20, 21, and 22 which tends to establish itself in circular saws having a number of teeth divisible by the factor 6. As discussed above, the nodal diameter lines represent lines of zero lateral displacement while the zones between them represent positive or negative displacement. The displacement wave associated with the saw of FIG. 5 is illustrated in FIG. 5a.

In order to minimize the tendency for the formation of nodal vibration patterns and to substantially diminish harmonic tooth-to-tooth vibrations, I have established the following criteria for the design of a circular saw in accordance with principles of the present invention. Firstly, the saw teeth are preferably arranged in an odd number of equal angular segments around the saw plate.

Each of the segments should include an angular zone having generally larger teeth, that is, teeth which are generally long between the point and the gullet. The angular zone having such larger teeth will exhibit generally more rigid or stiff flexure characteristics. A second angular zone is included in each segment having a greater number of teeth to establish a more flexible zone of the segment. The smaller teeth are shorter in length between the point and the gullet but have the same radial depth as the larger teeth.

A third angular zone of moderately sized teeth may optionally be used between the stiff and flexible angular zones to create additional dampening.

In order to avoid harmonic tooth-to-tooth vibrations, it is preferable that no two teeth within an angular segment have the same pitch. That is, the tooth-to-tooth spacing of all teeth within a segment should be randomly varied within appropriate limits while providing the generally stiffer and more flexible angular zones of each segment.

All of the angular segments in the saw are preferably identical so that the standing wave associated with any nodal vibration pattern which may tend to establish itself will result in an out-of-phase relationship of the lateral vibration displacement occurring at the beginning of a revolution of the saw plate with that which would occur at the end of the revolution. Stated differently, none of the distances between the saw teeth in any one segment are the same and, any symmetry in the saw plate is a symmetry which periodically repeats itself in a manner to assist in the nodal vibration self-cancelling effect.

It is preferable that the number of teeth in each of the equal angular segments is a prime number greater than two. It is also preferable that the number of equal angular segments around the saw plate is a prime number greater than two. A prime number is defined as a number having no factors except for itself and the number one. The following is the prime number series useful in the design of circular saws in accordance with the invention: 3, 5, 7, 11, 13, 17, 19, 23, 29, 31, 37 etc.

First, it is preferable to select, from the prime number series, the number of equal angular segments which will be employed in the saw. Next, the number of teeth in each segment is similarly selected from the series. The product of the number of segments and the number of teeth in each segment is the number of teeth employed in the entire saw. The individual segment of the saw is then designed to provide uneven tooth spacing and the flexible and stiff zones.

The design steps can best be understood in reference to the example of FIG. 1. In this example, five segments were selected. Also, seven teeth per segment were selected. The total number of teeth is therefore 35. The angular segment 30 is shown duplicated five times around the saw plate. The segment 30 occupies an angle of 72°. Three saw teeth are allocated to the flexible angular zone 31, one tooth is allocated to the angular zone of average flexibility 32, and three teeth are allocated to the relatively stiff zone 33. It is not essential that the angular zone 33 be equal to the angular zone 31 though, near equality is preferable.

To determine the tooth-to-tooth spacing, the angular distance occupied by a segment is divided by the total number of teeth in the segment to obtain a normal angular spacing as would be occupied by the saw teeth if they were equally spaced within the segment. For example, the 7 teeth in the segment 30 would normally occupy an angle of 72° divided by 7 or, 10°17'. Next, the number of teeth allocated to the relatively stiff angular zone 33 is multiplied by the normal angular spacing increased by an appropriate multiplier in the range of about 1.02 to 1.20 to provide for larger teeth. In this example, the angular zone 33 is 10°17'×3×1.08, or 33°20'. The angle occupied by the more flexible zone 31 is similarly determined by reducing the angle which would be occupied by the number of teeth allocated thereto if of normal spacing. The single tooth occupying the angular zone of average flexibility is established as occupying its normal tooth width, i.e., the angle 10°17'.

Referring again to the zone 33, an initial uniform tooth spacing is next determined by dividing the angle occupied by the zone 33, as above calculated, by the number of teeth therein, or, in this example, 33°20'÷3=11°7'. The initial tooth spacing so determined is randomly varied from tooth-to-tooth by an amount as great as about ±20% to arrive at the final tooth spacing or, in this example, it is varied in the range of about +7.4% and −3.3%. Thus, the angle between the points of teeth 34–35 is increased to 11°56' while the angle between the points of teeth 35–36 is decreased to 10°39' and the angle between the points of teeth 36–37 is established at 10°44'.

A similar procedure is used to design the more flexible angular zone 31. The initially selected angle for zone 31 is multiplied by a multiplier, less than one, selected from the range of about 0.83 to 0.98 so that the sum of the angles occupied by zones 31, 32, and 33 is equal to the angle occupied by the entire segment 30. Using the angle so calculated for the zone 31, the normal tooth spacing therein is next determined and then randomly varied by an amount as great as about ±20% to arrive at the final tooth spacing. In this example, the angle of zone 31 is determined by using a multiplier of 0.92, thusly: 3×0.92×10°17'=28°23'. Also, in this example, the tooth-to-tooth spacing is varied in the range of about +5.6% to −2.4% so that the final spacing between the points of teeth 38–39 is 9°14' and between 39–40 is 9°10' and between 40–41 is 10°0'.

The tooth spacing thus established for the segment 30 is preferably identically duplicated for each of the remaining segments 50, 51, 52, and 53. It will be appreciated that any symmetrical aspects of the saw plate thus designed will tend to deliberately reinforce the nodal vibration self-cancelling effects further discussed below.

Figure 7:
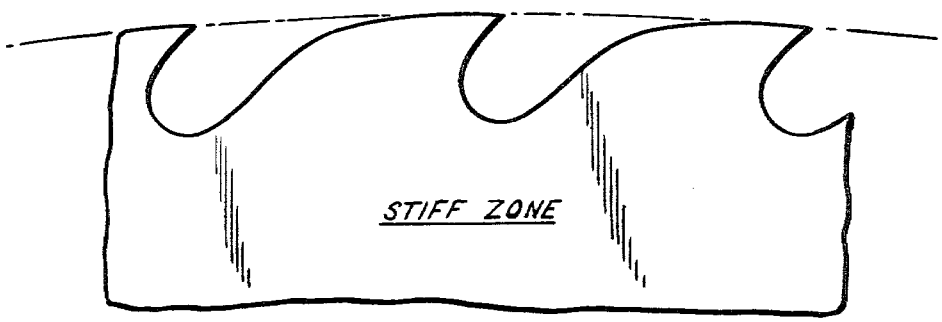
FIGS. 7, 8, and 9 are partial front elevation views of peripheral portions of a circular saw illustrating tooth spacing for establishing a relatively stiff zone, an average zone, and a relatively flexible zone, respectively.
Figure 8:
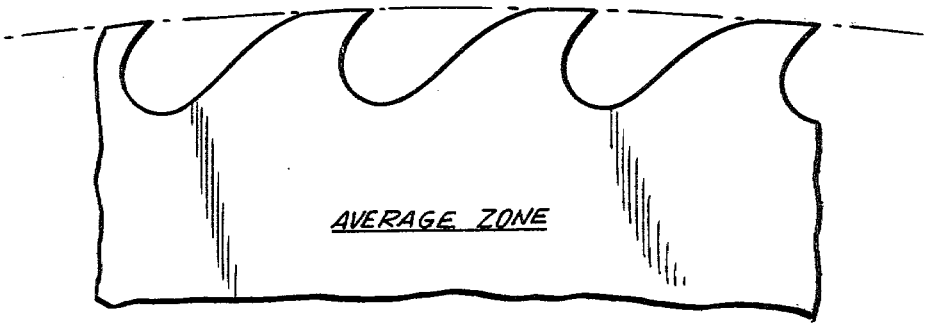
Figure 9:
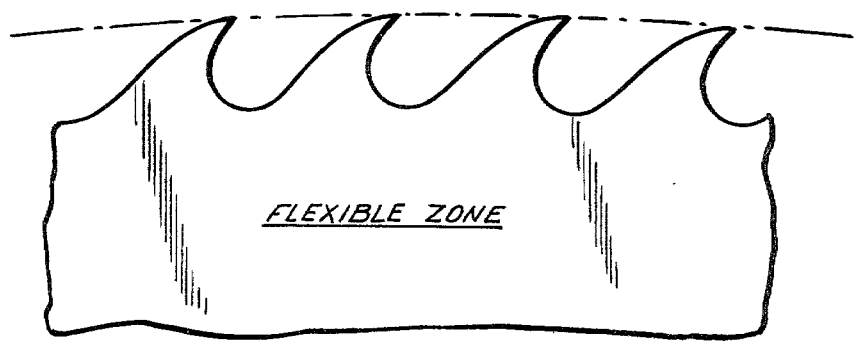

The points of all the saw teeth preferably extend equidistantly in a radial direction from the axis of the saw plate. Also, the radial depth of each of the saw teeth is preferably the same. Thus, angular zones having greater numbers of teeth are more deprived of saw plate material than angular zones having fewer teeth if the gullet geometry is maintained essentially constant. In this connection see FIGS. 7, 8, and 9.

In the above example, no two teeth are located directly opposite each other across a diameter line. Nor are any identical teeth located one-half, one-quarter, or one-sixth of a revolution away from each other so as to contribute to a systematically reinforced nodal vibration pattern. Each tooth in a given segment has an identically shaped companion tooth located one-fifth of a revolution away in the next segment. Thus, all reinforcing vibrational effects of the teeth contribute to a nodal pattern which tends to be self-cancelling.

Figure 6:
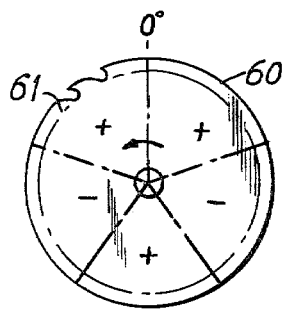
FIG. 6 is a front elevation view of a rotating circular saw embodying features of the present invention and exhibiting 2½ nodal diameters of vibration.
Figure 6A:
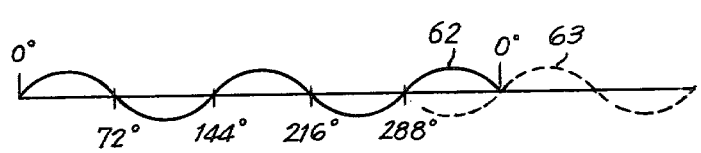

The self-cancelling effect is shown in FIGS. 6 and 6a. Any nodal vibration pattern which would tend to establish itself in the saw of FIG. 1 would tend to do so in connection with the period of repetition of tooth geometry. Thus, the lowest frequency nodal pattern which may tend to develop would have as its half period one angular segment. Other nodal patterns possible would have frequencies which are a multiple of such frequency. In FIGS. 6 and 6a the first node of the lowest frequency pattern is shown at 0°. A second node occurs at 72°. A third node occurs at 144° and a fourth node occurs at 216°. A fifth node would tend to occur at 288° and a sixth node would tend to occur at 360° or 0°. However, because the number of segments is an odd number, the lateral vibration excursion of the last segment 61 is 180° out-of-phase with respect to the adjacent, and first, angular segment 60. As a result the periodic reinforcement required to sustain the standing wave associated with the nodal vibration pattern will not occur and the nodal vibration pattern will tend to be self-cancelling. The phase relationship is shown at 62, 63 in FIG. 6a.

The above described design approaches can be used with a variety of sizes of saws having various numbers of teeth provided the number of segments representing repeated tooth geometry is an odd number, and an odd number of teeth is maintained in each segment. Saw designed in accordance with the foregoing can be expected to enjoy substantially reduced noise and vibration, higher operating speeds and cleaner cuts.

While the invention has been described with a certain degree of particularity, it can nevertheless be seen by the examples hereinabove set forth that many modifications and variations may be made without departing from the true spirit and scope thereof.

I claim:

1. A circular saw having improved vibration characteristics comprising:
    a circular saw plate;
    a multiplicity of saw teeth circumferentially disposed around said saw plate;
    said saw teeth being positioned in a plurality of generally equal angular segments around said saw plate each segment including a plurality of said saw teeth the majority of which are randomly spaced from each other, each said segment including a first angular zone which is generally stiffer than the balance of said segment, and wherein the quantity of said segments around said saw plate is an odd number;
    whereby as said saw is rotated said segments tend to induce a nodal vibration whose period corresponds to two of said segments and periodic reinforcement of said nodal vibration tends to be avoided by an out-of-phase relationship of the vibration excursion occurring at the beginning of one revolution of said saw with respect to the vibration excursion occurring at the end of said revolution.

2. A circular saw as recited in claim 1 wherein the quantity of said segments around said saw plate is a prime number.

3. A circular saw as recited in claim 2 wherein said generally stiffer first angular zone of said segment includes saw teeth which are generally more widely spaced than the saw teeth included in a second angular zone of said segment.

4. A circular saw as recited in claim 3 wherein the quantity of saw teeth in said segment is an odd number.

5. A circular saw as recited in claim 4 wherein said saw teeth in said segment are of equal depth and wherein said quantity of saw teeth in said segment is a prime number.

6. A circular saw as recited in claim 5 wherein the angular distance between adjacent saw teeth of essentially all of said saw teeth in each said segment is randomly varied whereby tooth-to-tooth harmonic vibrations tend to be avoided.

7. A circular saw as recited in claim 6 wherein said quantity of angular segments is five and said quantity of saw teeth in each of said segments is seven.

8. A circular saw having improved vibration characteristics comprising:
   a circular saw plate;
   a plurality of saw teeth circumferentially disposed around said saw plate;
   said saw teeth being positioned to form an odd plurality of generally equal angular segments around said saw plate, each of said segments being defined by an odd plurality of said saw teeth and the tooth-to-tooth spacing of said odd plurality of saw teeth in each segment is randomly varied to provide a first angular zone in each said segment of generally greater tooth-to-tooth spacing than an adjacent angular zone in each said segment.

9. A circular saw as recited in claim 8 wherein said tooth-to-tooth spacing in each said segment is randomly varied by an amount within the range of about +20% to about −20%.

10. A circular saw as recited in claim 8 wherein said odd plurality of equal angular segments is five and wherein said odd plurality of saw teeth defining each of said segments is seven.

11. A circular saw as recited in claim 10 wherein said seven saw teeth are of generally constant depth and wherein said tooth-to-tooth spacing in said first angular zone is randomly varied between an angle of about 10°39′ to an angle of about 11°56′ and the tooth-to-tooth spacing of said adjacent angular zone is varied between an angle of about 9°10′ to an angle of about 10°.

* * * * *